United States Patent
Blettner et al.

(10) Patent No.: US 8,496,725 B2
(45) Date of Patent: Jul. 30, 2013

(54) COMPOSITION FOR PRODUCING MAGNETIC OR MAGNETIZABLE MOLDINGS, AND PROCESS FOR PRODUCING THE SAME

(75) Inventors: Carsten Blettner, Bad Dürkheim (DE); Jürgen Kaczun, Wachenheim (DE); Ria Kress, Ludwigshafen (DE); Dag Wiebelhaus, Neustadt (DE)

(73) Assignee: BASF SE (DE)

( * ) Notice: Subject to any disclaimer, the term of this patent is extended or adjusted under 35 U.S.C. 154(b) by 0 days.

(21) Appl. No.: 13/069,779

(22) Filed: Mar. 23, 2011

(65) Prior Publication Data
US 2011/0233811 A1 Sep. 29, 2011

Related U.S. Application Data

(60) Provisional application No. 61/316,458, filed on Mar. 23, 2010.

(51) Int. Cl.
| B22F 1/00 | (2006.01) |
| B22F 3/02 | (2006.01) |
| H01F 1/22 | (2006.01) |
| H01F 1/147 | (2006.01) |

(52) U.S. Cl.
USPC ......... 75/252; 252/62.54; 252/62.55; 419/65; 419/66

(58) Field of Classification Search
USPC ............... 75/252; 148/100, 101, 105, 302, 148/306, 312, 314; 252/62.54, 62.55; 419/65, 419/66
See application file for complete search history.

(56) References Cited

U.S. PATENT DOCUMENTS

| 4,919,858 A | * | 4/1990 | Newton et al. ................. 264/429 |
| 4,923,912 A | * | 5/1990 | Sasaki et al. ................... 523/466 |
| 5,114,604 A | * | 5/1992 | Ishii et al. ................... 252/62.54 |
| 6,198,375 B1 | | 3/2001 | Shafer |
| 6,221,270 B1 | * | 4/2001 | Saito et al. ................. 252/62.55 |
| 6,680,000 B2 | * | 1/2004 | Sasazawa et al. .......... 252/62.54 |
| 7,381,280 B2 | * | 6/2008 | Yamashita .................... 148/104 |
| 2006/0090594 A1 | | 5/2006 | Fujisawa et al. |
| 2008/0118766 A1 | | 5/2008 | Fujisawa et al. |

FOREIGN PATENT DOCUMENTS

| CN | 1414577 A | | 4/2003 |
| CN | 1765547 A | | 5/2006 |
| JP | 10-303009 A | | 11/1998 |
| SU | 1070612 A | * | 1/1984 |

OTHER PUBLICATIONS

Notification of Transmittal of the International Search Report and the Written Opinion of the International Searching Authority from PCT/IB2011/051112 dated May 31, 2012.

* cited by examiner

*Primary Examiner* — Roy King
*Assistant Examiner* — Ngoclan T Mai
(74) *Attorney, Agent, or Firm* — Novak Druce Connolly Bove + Quigg LLP

(57) ABSTRACT

The invention relates to a composition for producing magnetic or magnetizable moldings, comprising from 95.5 to 98.95% by weight of a powder made of a magnetic or magnetizable material, from 1.0 to 4% by weight of a mixture made of at least one epoxy-novolak resin, and also of at least one hardener, and comprising from 0.05 to 0.5% by weight of at least one additive, based in each case on the total weight of the composition. The mixture made of the at least one epoxy-novolak resin and of the at least one hardener comprises from 85 to 95% by weight of the epoxy-novolak resin and from 5 to 15% by weight of hardener. The hardener has been selected from (cyclo)aliphatic amines and their adducts, polyamides, Mannich bases, amidoamines, phenolic resins, imidazoles, and imidazole derivatives, dicyandiamide, and $BF_3$-monoethanolamine. The invention further relates to a process for producing the composition, and also to a process for producing a molding made of the composition.

11 Claims, No Drawings

COMPOSITION FOR PRODUCING MAGNETIC OR MAGNETIZABLE MOLDINGS, AND PROCESS FOR PRODUCING THE SAME

CROSS-REFERENCE TO RELATED APPLICATIONS

This application claims benefit of U.S. Provisional application 61/316,458, filed Mar. 23, 2010.

BACKGROUND OF THE INVENTION

The invention relates to a composition for producing magnetic or magnetizable moldings, comprising a powder made of a magnetic or magnetizable material, a mixture made of at least one epoxy-novolak resin, and also of at least one hardener, and comprising, if appropriate, at least one additive.

The invention further relates to a process for producing the composition and to a process for producing a molding made of the composition. Magnetic or magnetizable moldings are used by way of example as coil cores or coil formers. Coils with corresponding coil cores or coil formers are used by way of example as electromagnets, in generators, in laptop computers, in netbooks, in mobile telephones, in electric motors, in AC inverters, in electronic components for the automobile industry, in toys and in the electronics industry. The current method aimed at allowing production of moldings of any shape compresses a mixture made of a magnetic or magnetizable material, such as carbonyl iron powder, and also of a curable resin, into a mold, and then hardens the mixture. The resin used comprises, for example, an epoxy resin. This type of composition, where a composition made of carbonyl iron powder, of epoxy resin, and of a lubricant is molded to give a coil former, is known by way of example from U.S. Pat. No. 6,198,375. The epoxy resin/hardener mixture used here comprises Corvel Black® No. 10-7086 from Morton International. The lubricant used is a zinc stearate.

US-A 2008/0118766 discloses a mixture where an epoxy-novolak resin is used in conjunction with an amine hardener or with an acid hardener. The amount of the resin used here is from 0.05 to 1% by weight, based on the total weight of the mixture. A disadvantage of the composition known from the prior art is that dry premixing causes inhomogeneous distribution of the resin within the molding, and also causes long hardening times. Another disadvantage, particularly when epoxy resins are used, is that the storage stability of the finished mixture is only low, and the mixture is sensitive to moisture, particularly when anhydrides are used as hardeners.

BRIEF SUMMARY OF THE INVENTION

It is an object of the present invention to provide a composition which can produce magnetic or magnetizable moldings and which, in comparison with the prior art, has improved mechanical strength and higher fracture resistance.

The object is achieved via a composition for producing magnetic or magnetizable moldings, comprising from 95.5 to 98.95% by weight of a powder made of a magnetic or magnetizable material, from 1.0 to 4% by weight of a mixture made of at least one epoxy-novolak resin, and also of at least one hardener, and comprising from 0.05 to 0.5% by weight of an additive, based in each case on the total weight of the composition, wherein the mixture made of the at least one epoxy-novolak resin and of the at least one hardener comprises from 85 to 95% by weight of epoxy-novolak resin and from 5 to 15% by weight of hardener, based in each case on the mixture made of resin and hardener, where the hardener has been selected from (cyclo)aliphatic amines and their adducts, polyamides, Mannich bases, amidoamines, phenol resins, imidazoles, and imidazole derivatives, dicyandiamide, and $BF_3$-monoethanolamine.

It has been found that moldings which are produced from the composition of the invention have higher mechanical strength than moldings made of the compositions known from the prior art. In particular, moldings produced from the composition of the invention have high fracture resistance, without any attendant impairment of magnetic properties. Very good heat resistance is moreover achieved through increased glass transition temperature of the composition of the invention.

DETAILED DESCRIPTION OF THE INVENTION

It is particularly preferable that the powder made of the magnetic or magnetizable material has been coated with the epoxy-novolak resin and with the hardener. The coating achieves uniform distribution of resin and hardener within the composition, and a molding produced therefrom therefore has uniform constitution and high fracture resistance.

In order to coat the powder made of the magnetic or magnetizable material with the mixture made of epoxy-novolak resin and hardener, the composition is preferably produced by a process which comprises the following steps:

(a) dissolution of an epoxy-novolak resin in a solvent,
(b) addition of a hardener to the dissolved epoxy-novolak resin, with continuous mixing, where the proportion of hardener, based on the weight of resin and hardener, is in the range from 5 to 15% by weight,
(c) addition of a powder made of magnetic or magnetizable material to the mixture, with continuous mixing, where the proportion of powder made of magnetic or magnetizable material, based on the weight of resin, hardener, and powder made of magnetic or magnetizable material is in the range from 95.5 to 98.95% by weight,
(d) removal of the solvent from the mixture, to give a dry product, and
(e) grinding of the dry product to give a powder.

The process of the invention for producing the composition achieves uniform distribution of the resin within the powder, since the powder made of magnetic or magnetizable material is coated with the resin.

A suitable solvent in which the epoxy-novolak resin is dissolved is any desired solvent in which the resin used, and if appropriate the hardener, dissolve(s). Particularly suitable solvents are methyl ethyl ketone (MEK), acetone, or methyl isobutyl ketone. Examples of other suitable solvents are aromatic hydrocarbons, such as toluene or xylene; alkyl esters, such as methyl acetate, ethyl acetate, propyl acetate, butyl acetate, isobutyl acetate, isopropyl acetate, and 3-methylbutanol; alkoxy alcohols, such as methoxypropanol, methoxybutanol, ethoxypropanol; alkylbenzenes, such as ethylbenzene, isopropylbenzene; butyl glycol, butyl diglycol, alkyl glycol acetates, such as butyl glycol acetate and butyl diglycol acetate; 2-methoxy-1-methylethyl acetate, diglycol dialkyl ethers, diglycol monoalkyl ethers, dipropylene glycol dialkyl ethers, dipropylene glycol monoalkyl ethers, diglycol alkyl ether acetates, dipropylene glycol alkyl ether acetates, ethers, such as dioxane and tetrahydrofuran, lactones, such as butyrolactone; ketones, such as acetone, 2-butanone, cyclohexanone, methyl ethyl ketone (MEK), methyl isobutyl ketone (MIBK); methylphenol (ortho-, meta-, or para-cresol), pyrrolidones, such as N-methyl-2-pyrrolidone; dimethylformamide, and also mixtures made of two or more of these solvents.

The amount of solvent is selected in such a way that the epoxy-novolak resin used dissolves completely.

The composition can be produced batchwise or else continuously. In the case of batchwise production, the individual components are charged together to a suitable container, such as a stirred tank. In the case of continuous production, it is advantageous that the components used are added in succession to a suitable continuous mixer. In another possible method here, a separate mixing assembly is used for the admixture of each individual component. As an alternative, it is also possible to mix all of the components in one mixing assembly. When all of the components are mixed in one assembly it is advantageous to begin by dissolving the epoxy-novolak resin in the solvent, and then to add the other components.

However, preference is given to batchwise production of the composition in a suitable container.

In order to achieve a further improvement in the quality of the moldings produced from the composition it is preferable, after the grinding of the dry product to give a powder, to carry out particle-size classification of the powder. The particle-size classification of the powder can by way of example use sieves. Use of the sieve permits division of the powder into fractions with different particle sizes. Particles which are excessively small or excessively large and which remain as sieve residues can be returned to the process. It is particularly preferable here that the residues are added prior to, during, or after the addition of the powder made of magnetic or magnetizable material, and prior to the removal of the solvent. It is particularly preferable that the residues are added to the mixture prior to the addition of the powder made of magnetic or magnetizable material. The resin comprised within the residues can thus dissolve again in the solvent.

A conventional drying process is used to remove the solvent from the mixture in step (d) for producing the dry product. It is therefore possible by way of example to evaporate the solvent at room temperature. It is moreover also possible to dry the mixture at elevated temperature, preferably in vacuo. When drying is conducted at elevated temperature, the temperature at which the drying process is conducted is to be selected in such a way that the crosslinking reaction of resin and hardener is not initiated.

An epoxy-novolak resin is used in the invention to produce the composition. An epoxy-novolak resin is a polyfunctional epoxy resin with high strength and good chemicals resistance at elevated temperatures.

Epoxy-novolak resins are produced by acid-catalyzed condensation of a phenolic precursor with formaldehyde, and subsequent epoxidation with epichlorohydrin. An example of a precursor that can be used is phenol, bisphenol A, or ortho-cresol. Depending on the precursor used, the resultant epoxy-novolak resins are phenol novolak resin, cresol-novolak resin, or bisphenol A-novolak resin. The synthesis of epoxy-novolaks gives them high epoxy functionality, and this can be markedly higher, with values of from 1.7 to up to 8, than for conventional epoxies based on bisphenol A, which are mostly bifunctional. The polyfunctionality provides additional reactive sites, thus permitting production of highly crosslinked systems which feature improved acid/base resistance, retention of mechanical properties at elevated temperatures and in a moist environment, minimal shrinkage, and improved binder action at elevated temperatures.

Any of the hardeners and accelerators that can react with epoxy groups is suitable for the crosslinking of the epoxy-novolak resins. Examples of suitable hardeners and accelerators are (cyclo)aliphatic amines, and also their adducts, polyamides, Mannich bases, amidoamines, phenolic resins, imidazoles and imidazole derivatives, dicyandiamide, and $BF_3$-monoethanolamine.

For the purposes of the present invention, (cyclo)aliphatic amines are cycloaliphatic amines, aliphatic amines, and mixtures made of cycloaliphatic and of aliphatic amines.

It is particularly preferable that the hardener has been selected from imidazoles, imidazole derivatives, dicyandiamide, and $BF_3$-monoethylamine. The hardener is very particularly preferably dicyandiamide.

If an imidazole or imidazole derivative is used as hardener, examples of suitable compounds are imidazole, aliphatic imidazole derivatives, such as 2-ethyl-4-methylimidazole, 2-undecylimidazole, 2-heptadecylimidazole, 1,2-dimethylimidazole, also aromatic imidazole derivatives, such as 1-benzyl-2-methylimidazole, and 2-phenylimidazole, 1-benzyl-2-methylimidazole, and 2-phenyl-4-methylimidazole. Imidazoles that can be used as hardener are available commercially.

In order to permit production of magnetic or magnetizable moldings, the composition comprises from 95.5 to 98.95% by weight, preferably from 96 to 98% by weight, of a powder made of a magnetic or magnetizable material.

The powder used made of a magnetic or magnetizable material can comprise a powder made of particles of any desired shape, made of any desired magnetic or magnetizable material. Suitable magnetic or magnetizable materials are iron, cobalt, nickel, molybdenum, manganese, or else NiCoFe, NiCuCo, AlNi, AlNiCo, FeCrV, FeCo, FeNi, $MnAlCu_2$, SmCo, $Nd_2Fe_{14}B$, FeSi, FeSiAl, or a mixture made of two or more of these materials. Iron is particularly preferred, in particular in the form of carbonyl iron powder.

The average particle diameter of the individual powder particles is preferably from 0.001 to 100 µm, with preference from 0.005 to 50 µm, and with particular preference from 0.01 to 10 µm. The average particle diameter can be determined by using laser scattering, for example in a Microtrac X100 device. The distribution of the particle diameters depends on the process used to produce the particles. The diameter distribution typically has only one maximum, but a plurality of maxima is also possible.

At least part of the surface of the magnetic or magnetizable particles can have been provided with a coating. Suitable coatings can be of inorganic type (an example being $SiO_2$ or $SiO_2$ phosphates) or of organic type. The magnetic or magnetizable particles can also, of course, have been coated with a metal or metal oxide.

If the intention is that two or more different materials form the magnetic or magnetizable particles, this can be achieved by mixing of said materials.

Alongside the selection of the material of the magnetic or magnetizable particles, the shape of the particles that form the powder also has an effect on the properties of the moldings produced therefrom. With regard to the shape of the particles, there are numerous possible variants known to the person skilled in the art. The shape of the magnetizable or magnetic particles can by way of example be acicular, cylindrical, lamellar, or spherical. These particle shapes represent idealized shapes, and the actual shape here can, for example as a result of the production process, deviate to a relatively large extent therefrom. By way of example, therefore, droplet-shaped particles are for the purposes of the present invention a practical deviation from the idealized shape of a sphere.

When mixtures of magnetic or magnetizable particles are used, the individual components of the mixture can also have different particle shapes or particle sizes. It is also possible to use mixtures of only one type of magnetizable or magnetic particles with different particle sizes or particle shapes.

Powders made of a magnetic or magnetizable material are familiar commercially available products, or can easily be produced by using known processes, for example by using electrolytic deposition processes, or chemical reduction from solutions of metal salts, or by using reduction of an oxidic powder, for example by means of hydrogen, or by using spraying or passage of a metal melt through a nozzle, in particular into coolants, such as gases or water. Preference is given to gas- or water-based processes where materials are passed through a nozzle, and also to the reduction of metal oxides. Metal powders of the preferred grain size can also be produced by milling of coarser metal powders. By way of example, a ball mill is suitable for this purpose.

In the case of iron, another preferred process alongside the gas- and water-based processes that pass materials through nozzles is the carbonyl iron powder process for producing carbonyl iron powder. This process uses thermal decomposition of pentacarbonyliron. This is described by way of example in Ullmann's Encyclopedia of Industrial Chemistry, 5th edition, Vol. A14, page 599. By way of example, the pentacarbonyliron can be decomposed at elevated temperatures and elevated pressures in a heatable decomposer system which comprises a tube made of a heat-resistant material, such as quartz glass or V2A steel, preferably in a vertical position, where the tube has a surrounding heater, for example composed of heater baths, or heater wires, or of a heater jacket through which a heating fluid passes.

The spherical magnetic or magnetizable particles produced can be controlled by using optimized conditions in the production process, or can be obtained subsequently by using mechanical treatment, for example by using mechanical treatment in a stirred ball mill.

The composition can comprise at least one additive, alongside the powder made of the magnetic or magnetizable material and alongside the mixture made of at least one epoxynovolak resin and of at least one hardener. The proportion of additives in the composition is preferably in the range from 0.01 to 0.5% by weight, with preference in the range from 0.02 to 0.4% by weight, and in particular in the range from 0.05 to 0.2% by weight, based in each case on the total weight of the composition.

In particular, the composition comprises a lubricant as additive. If the composition comprises a lubricant, the proportion of lubricant in the composition is preferably in the range from 0.01 to 0.5% by weight, in particular in the range from 0.05 to 0.2% by weight, based in each case on the total weight of the composition.

Examples of suitable lubricants are waxes, fatty acids, fatty acid amides, salts of higher fatty acids, and siloxanes.

It is preferable that the lubricant has been selected from synthetic waxes, amide-based waxes, Teflon-based waxes, metal stearates, polymer lubricants, fatty acids, boric acid, and borate esters, and siloxanes, such as vinyltrimethoxysiloxane or polydimethylsiloxane.

It is very particularly preferable that the lubricant is a salt of a higher fatty acid, an example being calcium stearate, zinc stearate, barium stearate, magnesium stearate, or zinc oleate.

The lubricant can be mixed in dry form with the composition, or is dissolved or melted for the process of mixing with the composition. It is preferable that the lubricant is added to dry powder.

Any desired other lubricant that is used in powder-metallurgy processes is suitable alongside the abovementioned lubricants. The selection of a suitable lubricant depends in particular on the desired properties of the material. By way of example, it is therefore possible that some lubricants provide parts with higher electrical resistance after heat-treatment, whereas other lubricants result in higher permeability or higher mechanical strength. The amount of lubricant likewise depends on the desired properties of the molding to be produced.

Addition of the lubricant reduces friction between the molding to be produced and mold walls, thus ensuring that the formulated powder has flowability in the production process, and reducing wear on the mold during production of the molding, in particular during compression of the components. The lubricant further inhibits formation of electrical contact between individual particles during the compression process, and significantly increases the electrical resistance of the compressed green product.

The composition can also comprise not only the lubricant but also other additives. Examples of these other additives are catalysts for the epoxy-polymerization process, which are used in addition to the hardener, examples being imidazole derivatives or dialkylureas in proportions of from 0.1 to 2%, based on the resin/hardener system. When a catalyst for the epoxy-polymerization process is added as further additive, this is preferably added to the epoxy-novolak resin dissolved in the solvent. The catalyst here can be added simultaneously with the hardener, into the mixture obtained in step (b) comprising hardener and dissolved epoxy-novolak resin, or prior to the addition of the hardener to the dissolved epoxy-novolak resin.

The composition is used to produce a magnetic or magnetizable molding. Particular moldings of this type are coil cores or coil formers, as used in electrical engineering. Coils with corresponding coil cores or coil formers are used by way of example as electromagnets, in generators, in laptop computers, in netbooks, in mobile telephones, in electric motors, in AC inverters, in electronic components in the automobile industry, in toys, and in the electronics industry. The composition can moreover be used to produce magnetic-field concentrators.

To produce a molding, the composition is compressed in a mold to give a molding, and then heated in order to initiate a reaction of the epoxy-novolak resin. The temperature at which the reaction of the epoxy-novolak resin with the hardener is initiated depends on the hardener used. The temperature is usually in the range from 100 to 220° C., preferably from 120 to 200° C.

The compression, and the reaction of the epoxy-novolak resin with the hardener, produces a molding which has high strength.

The compression of the composition to give the molding preferably takes place at a pressure in the range from 10 to 100 bar and in particular in the range from 20 to 80 bar.

EXAMPLES

To produce the composition for producing magnetic or magnetizable moldings, from 10 to 200 ml of methyl ethyl ketone are used as initial charge in the form of solvent in a mixer. From 30 to 35 g of an epoxy-novolak resin are added to the solvent and completely dissolved, with mixing. Dicyandiamide in the form of 20% strength solution in dimethylformamide is added to the solution with continuous mixing. Table 1 gives the respective amount of dicyandiamide.

After addition of the hardener, 1000 g of carbonyl iron powder are added, with further continuous mixing. After addition of the carbonyl iron powder, mixing is continued for at least 15 further minutes.

The resultant mixture is then dried, by substantially removing the solvent by evaporation at room temperature. In order to obtain a dry product, the mixture is poured onto metal sheets for the drying process, in order to obtain a large surface area. Drying is then continued for 12 hours in a vacuum oven at a pressure of 20 mbar and a temperature of 30° C.

The dried product is then ground and sieved in order to adjust to the respective particle size desired.

TABLE 1

Formulations for the inventive examples

|  | Epoxy resin | Amount [% by wt.] | Amount of dicyandiamide [phr] | Carbonyl iron |
|---|---|---|---|---|
| Inventive Example 1 | Phenol-novolak | 2.5 | 5 | SQi |
| Inventive Example 2 | Phenol-novolak | 2.5 | 5 | CS |
| Inventive Example 3 | Phenol-novolak | 2.5 | 5 | CS + SiO$_2$ coating |
| Inventive Example 4 | Phenol-novolak | 2.5 | 15 | SQi |
| Inventive Example 5 | Cresol-novolak | 2.5 | 5 | SQi |
| Inventive Example 6 | Phenol-novolak | 2.5 | 5 | SQi |

TABLE 2

Comparative examples

|  | Epoxy resin | Amount [% by wt.] | Hardener | Carbonyl iron |
|---|---|---|---|---|
| Comparative Example 1 | Corvel Black | 3.3 | Pyromellitic anhydride | SQi |
| Comparative Example 2 | Bisphenol A | 2.5 | Methyltetrahydrophthalic anhydride | SQi |

The phenol-novolak used in Inventive Examples 1 to 4 is Epikote® 154 from Hexion. The cresol-novolak used is Epon® 164 from Hexion. The phenol-novolak in Inventive Example 6 is DEN 639 from Dow.

The Corvel Black used in Comparative Example 1 is obtainable by way of example from Rohm and Haas. The bisphenol A used is Epikote® 1004 from Hexion.

The CS-type carbonyl iron powder is a reduced carbonyl iron powder, and the SQi-type material is a reduced and phosphated carbonyl iron powder from BASF SE.

TABLE 3

Results of experiments

|  | Permeability | Breaking force [N/mm] | Tg [° C.] |
|---|---|---|---|
| Inventive Example 1 | 32 | 63.5 | 126 |
| Inventive Example 2 | 39.7 | 62.1 | 124 |
| Inventive Example 3 | 25.4 | 63.4 | 126 |
| Inventive Example 4 | 31 | tbd | tbd |
| Inventive Example 5 | 29.7 | 65.5 | 131 |
| Inventive Example 6 | 32.2 | tbd | 127 |
| Comparative Example 1 | 25.1 | 33.0 | 105 |
| Comparative Example 2 | 25.5 | 63.9 | 93 |

Table 3 shows that, particularly when the uncoated carbonyl iron powders are used, permeability is better than for the resins known from the prior art.

In the tables, the abbreviation "phr" means parts per hundred.

The invention claimed is:

1. A composition for producing magnetic or magnetizable moldings, comprising from 95.5 to 98.95% by weight of carbonyl iron powder, from 1.0 to 4% by weight of a mixture made of at least one epoxy-novolak resin, and also of at least one hardener, and also comprising from 0.05 to 0.5% by weight of at least one additive, based in each case on the total weight of the composition, wherein the mixture made of the at least one epoxy-novolak resin and of the at least one hardener comprises from 85 to 95% by weight of epoxy-novolak resin and from 5 to 15% by weight of hardener, based in each case on the mixture made of resin and hardener, where the hardener has been selected from (cyclo)aliphatic amines and their adducts, polyamides, Mannich bases, amidoamines, phenolic resins, imidazoles, or imidazole derivatives, dicyandiamide, or BF$_3$-monoethanolamine.

2. The composition according to claim 1, wherein the hardener has been selected from imidazoles, imidazole derivatives, dicyandiamide, or BF$_3$-monoethanolamine.

3. The composition according to claim 1, wherein the epoxy-novolak resin is a phenol novolak resin, a cresol-novolak resin, or a bisphenol A-novolak resin.

4. The composition according to claim 1, which comprises at least one lubricant as additive.

5. The composition according to claim 4, wherein the lubricant has been selected from waxes, fatty acids, fatty acid amides, or salts of higher fatty acids.

6. A process for producing the composition according to claim 1, comprising the following steps:
    (a) dissolving an epoxy-novolak resin in a solvent,
    (b) adding a hardener or of a hardener solution to the dissolved epoxy-novolak resin, with continuous mixing, where the proportion of hardener, based on the weight of resin and hardener, is in the range from 5 to 15% by weight,
    (c) adding a carbonyl iron powder to the mixture, with continuous mixing, where the proportion of powder made of magnetic or magnetizable material, based on the weight of resin, hardener, and powder made of magnetic or magnetizable material is in the range from 95.5 to 98.95% by weight,
    (d) removing the solvent from the mixture, to give a dry product, and
    (e) grinding of the dry product to give a powder.

7. The process according to claim 6, wherein the solvent is methyl ethyl ketone or acetone.

8. The process according to claim 6, wherein, after the grinding of the dry product, particle-size classification is carried out.

9. The process according to claim 8, wherein residues from the classification process are added to the mixture prior to the addition of the carbonyl iron powder, after the addition of the carbonyl iron powder, or during the addition of the carbonyl iron powder, with continuous stirring.

10. A process for producing a molding, by compressing the composition according to claim 1 in a mold to give a molding and then heating in order to initiate a reaction of the epoxy-novolak resin with the hardener.

11. The process according to claim 10, wherein the molding is a coil core, a coil former, or a magnetic-field concentrator.

* * * * *